United States Patent [19]
McCarthy

[11] Patent Number: 6,087,937
[45] Date of Patent: *Jul. 11, 2000

[54] SECURITY DEVICE

[75] Inventor: Shaun McCarthy, Ash Vale, United Kingdom

[73] Assignee: Accupage Limited, Hampshire, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/860,066
[22] PCT Filed: Feb. 23, 1996
[86] PCT No.: PCT/GB96/00403
  § 371 Date: Jun. 20, 1997
  § 102(e) Date: Jun. 20, 1997
[87] PCT Pub. No.: WO96/27174
  PCT Pub. Date: Sep. 6, 1996

[30] Foreign Application Priority Data

Feb. 25, 1995 [GB] United Kingdom .................. 9503846

[51] Int. Cl.$^7$ ............................. G08B 13/18; C08C 19/00
[52] U.S. Cl. ....................... 340/567; 340/568.1; 340/571; 340/539; 340/825.69; 364/709.05; 395/186
[58] Field of Search ..................................... 340/567, 568, 340/571, 572, 539, 825.69, 825.72, 825.44, 825.45, 568.1; 364/709.05; 455/1; 395/186

[56] References Cited

U.S. PATENT DOCUMENTS

| | | | |
|---|---|---|---|
| 4,246,573 | 1/1981 | Kiss | 340/539 |
| 4,639,726 | 1/1987 | Ichikawa et al. | 340/825.44 |
| 5,138,312 | 8/1992 | Tsukamoto et al. | 340/825.44 |
| 5,276,435 | 1/1994 | Rossides | 340/691 |
| 5,406,261 | 4/1995 | Glenn | 340/571 |

FOREIGN PATENT DOCUMENTS

| | | |
|---|---|---|
| 0 135 783 | 4/1985 | European Pat. Off. . |
| 0 505 266 | 9/1992 | European Pat. Off. . |
| 0 508 487 | 10/1992 | European Pat. Off. . |
| 91 11889 | 8/1991 | WIPO . |

*Primary Examiner*—Donnie L. Crosland
*Attorney, Agent, or Firm*—Lahive & Cockfield, LLP

[57] ABSTRACT

An apparatus for inhibiting the theft of an electronic device includes a processor unit and a display device for displaying operational output from the processor. A receiver unit is included within the electronic device and is adapted to receive remotely transmitted signals that are capable of causing the processor unit to at least partially obscure or change the output on the display device after such signal has been received. The electronic device can be any device that produces a visible output. The obscuring of the display output is by overprinting a message informing you that the device is stolen, and more preferred versions include a unique identification code in that message. This enables the authorities to identify the true owner of the article. The receiver can be a receiver of a radio pager. Upon noticing the theft of the device the owner alerts a service provider who activates the receiver unit.

12 Claims, 4 Drawing Sheets

SECURITY DEVICE

BACKGROUND OF THE INVENTION

The present invention relates to a security device, especially one intended for use in protecting electronic devices.

BACKGROUND

Computers are used routinely in a very large number of businesses and homes. The decrease in the cost of computing power has fueled this expansion, and at the same time advances in micro electronics have meant that the physical size and weight of a powerful computer has decreased to the point where even a desk top computer can be carried relatively easily.

This has meant that the theft of personal computers, in particular laptop computers, has become extremely easy and is now a serious problem. It is estimated that one quarter of all commercial computer users in the United Kingdom have been burgled or robbed of at least some of their computer stock. The value of this equipment stolen in 1994 was over £100 million. One dealer has estimated that 35% of his customers have been robbed; 25% of those have been robbed more than once, some as many as six or seven times.

The ease with which such thefts can be executed is illustrated by one example in which thieves entered the premises of a company at 9.57 pm and, in the following four minutes before the arrival of the police stole, £15,000 worth of equipment.

Once a computer is stolen, the hard disk can be reformatted and the computer can then be sold easily. It is estimated that one particular case reaped £3 million for the burglar.

Insurance companies who provide insurance against computer burglary now find that computer theft is dominating their time and causing severe losses. Often, insurance premiums increase significantly after a theft has taken place, or insurance is refused altogether. Insurers may often insist on improving security at business premises; the cost of this can be as much as £6,000.

Methods exist to protect computers against theft. These include physical means such as attaching security tags firmly to the computers or defacing the exterior surface of the computer to dissuade potential purchasers of the stolen goods. Both of these are unsightly and the former is liable to invite damage of the computer by the thief in an attempt to remove it.

Computers can be provided with password locks, which ensure that the computer will not operate until the correct password is entered. However re-formatting of the hard disk is usually possible and this will erase all software present, including the password lock.

U.S. Pat. No. 5,355,414 discloses a system whereby the peripheral devices (e.g. the display unit and keyboard) are disabled for a predetermined period of time if an incorrect password is entered. However, this is a software-based system and therefore inherently vulnerable.

U.S. Pat. No. 5,343,524 discloses a computer with an additional microprocessor which must be present in order to allow the system to operate. The contents of the microprocessor are said to be non-copyable. If the microprocessor is removed, then the computer will not operate. However, should the system be stolen, the thieves will presumably also take the microprocessor.

There therefore exists a need for a means for dissuading or preventing theft of computers and the like, at a cost which is ideally less than the cost of insuring the equipment.

SUMMARY OF THE INVENTION

The present invention therefore provides an electronic device comprising a processor unit and a display device for displaying operational output from the processor unit; the device including a receiver unit adapted to receive remotely transmitted signals and capable of causing the processor unit to at least partially obscure or change the output on the display device after such a signal has been received.

Preferably, the obscuring is by overprinting a message on top of the normal operational output. It may, of course be by replacing that ordinary operational output with a message, or the like.

Preferably, the receiver unit also causes the display of an identification code stored in the receiver unit. This will preferably be unique to that piece of equipment and will enable identification of the true owner.

Preferably, the receiver unit includes a power source distinct from that of the processor unit to enable continuous monitoring for incoming signals.

Those types of equipment which include a screen display can operate by obscuring the normal display of that screen. Those items of equipment which produce output in printed form can operate by superimposing a message on a printed output, or by replacing the output with the message. For example the electronic device can include computers, televisions, facsimile machines, photocopiers, video recorders, visual projection systems, or printers or any device capable of the above.

The receiver unit and remotely transmitted signals can be implemented by using similar technology to that employed by radio paging systems. This is an established remote signalling system in which a telephone call to the correct number (placed anywhere in the country) causes a signal to be sent to a portable receiver unit which is then activated. Such technology is well known and would need only simple modification to suit the present invention.

The present invention also relates to an upgrade kit, especially for installation in computers, which comprises the receiver device as defined above in conjunction with means for connecting the receiver unit with the remainder of the electronic device.

The present invention also relates to a method of decreasing the value of a stolen electronic device, comprising the steps of providing within the device prior to theft thereof, a receiver unit for receiving remotely transmitted signals, the receiver unit being adapted to obscure or change the visual output of the electronic device on being activated by a remotely transmitted signal;

wherein on loss or theft of the device, a signal is sent to the receiver unit to activate it.

Finally, the method the present invention relates to a method of inhibiting the theft of an electronic device, comprising the steps of providing within the device a receiver unit for receiving remotely transmitted signals, the receiver unit being adapted to obscure or change the visual output of the electronic device on being activated by a remotely transmitted signal; and providing on the device or in the vicinity of the device visible indicia indicating the presence within the device of the receiver unit.

These methods can be applied to, for example, the above-described electronic devices in the manner described.

BRIEF DESCRIPTION OF THE DRAWINGS

An embodiment of the present invention will now be described by way of example, with reference to the accompanying Figures in which.

DESCRIPTION OF ILLUSTRATED EMBODIMENT

Figure 1:
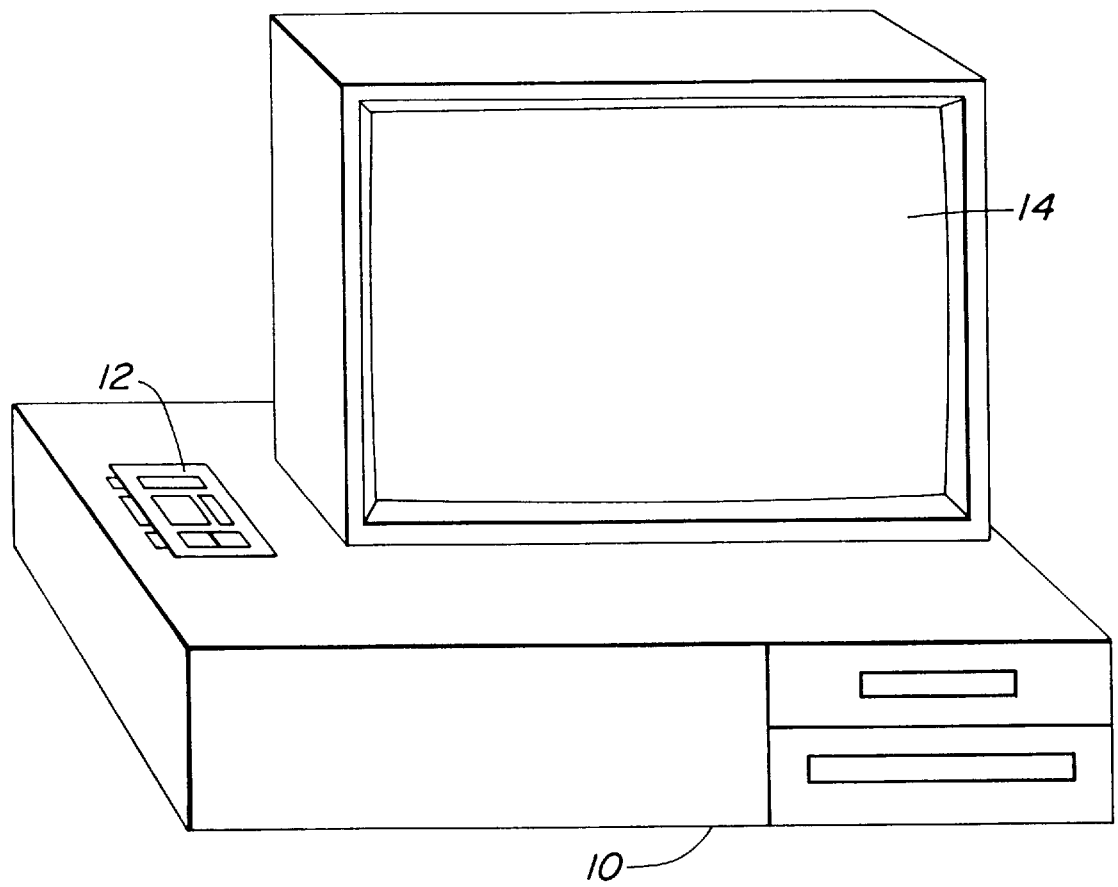
FIG. 1 is a perspective view of a computer incorporating the system.

FIG. 1 shows an otherwise conventional personal computer 10 having an additional card 12 fitted to its mother board. That mother board comprises a receiver unit generally similar to that employed in a radio paging device. That is to say, it is adapted to listen on a particular radio frequency for signals sent by a central transmitter, and on receiving a signal identifies whether the signal contains a code unique to that receiver unit. If so, the output of the receiver unit is activated.

Also present on the card 12 is a rechargeable battery independent of the main power source of the personal computer but adapted to recharge itself therefrom. Thus, the receiver unit of card 12 is able to listen on its allocated frequency continuously.

Also present on the card 12 is a signal processor for handling the signal produced by the PC 10 for onward transmission to a display unit 14. When an activation signal is received by the signal processor from the receiver unit, the signal processor from then onwards until reset superimposes on the normal output of the PC 10 a predetermined message. That message is, in this embodiment, large enough and prominent enough to obscure most of the normal output of PC 10.

Figure 2:
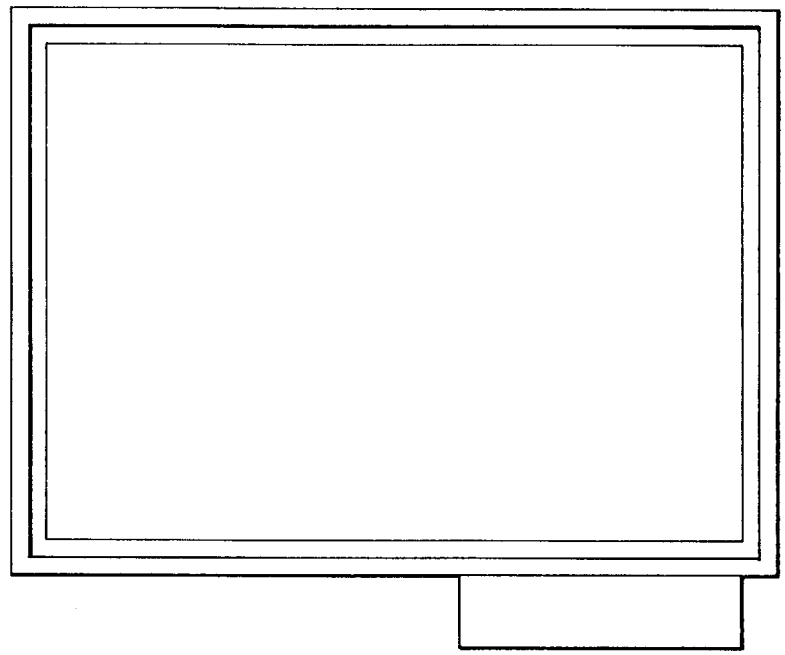
FIG. 2 is a view of a screen of a computer prior to activation of the system.

FIG. 2 shows the normal output of a personal computer. This PC is running under the Windows™ operating system and therefore is dependent on a graphical output for its operation. Windows™ is a Trade Mark of Microsoft Corporation.

Figure 3:
FIG. 3 is a view of a screen of a computer after activation of the system.

FIG. 3 shows the same screen immediately after activation of the card 12. A message is clearly and prominently displayed on top of the normal output shown in FIG. 2 and it is clear that the operation of this computer is significantly inhibited. Its value as a second-hand sale is therefore very low.

The displayed message also includes a code number 16 in the corner of the screen. That code number is unique to the signal processor within the card 12 and therefore should the computer 10 be retrieved by the police then this number can be used to identify the true owner.

Figure 4:
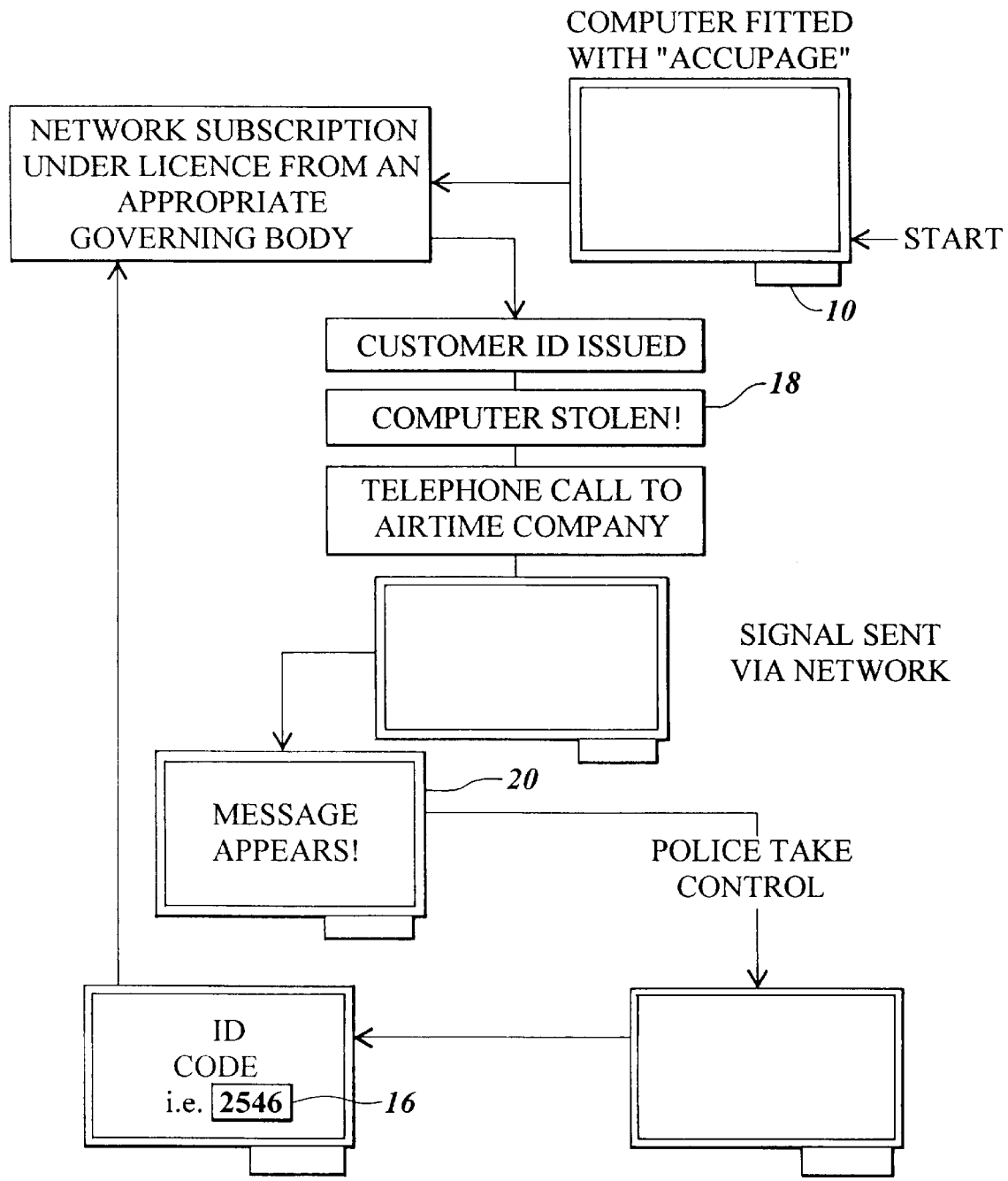
FIG. 4 is a flow chart showing the steps in the system.

FIG. 4 shows the steps in the operation of the system. A customer purchases a computer 10, in this case a laptop, which is fitted with the system according to the invention, here designated by the Trade Mark ACCUPAGE. The customer contacts the system provider who arranges an airtime subscription to a paging service sub-let from the relevant telecommunications provider, in this case British Telecom. Then an identification file is created for that customer and an identification number 16 stored in that computer is logged.

It is of course to be hoped that this particular customer never proceeds further along this flow chart. However, should the computer be stolen (box 18), then the customer can call the service provider and identify their stock that has been stolen. The service provider then identifies (from the identification file previously created) the electronic addresses of the receiver units within the stolen computer 10, and sends a signal to activate those receiver units. This is then received by the receiver units, and the message appears on the screen, step 20. The thief is then likely to abandon the stock, whereupon it should fall into the hands of the police who can use the identification code 16 to return the equipment to its rightful owner.

Figure 5:
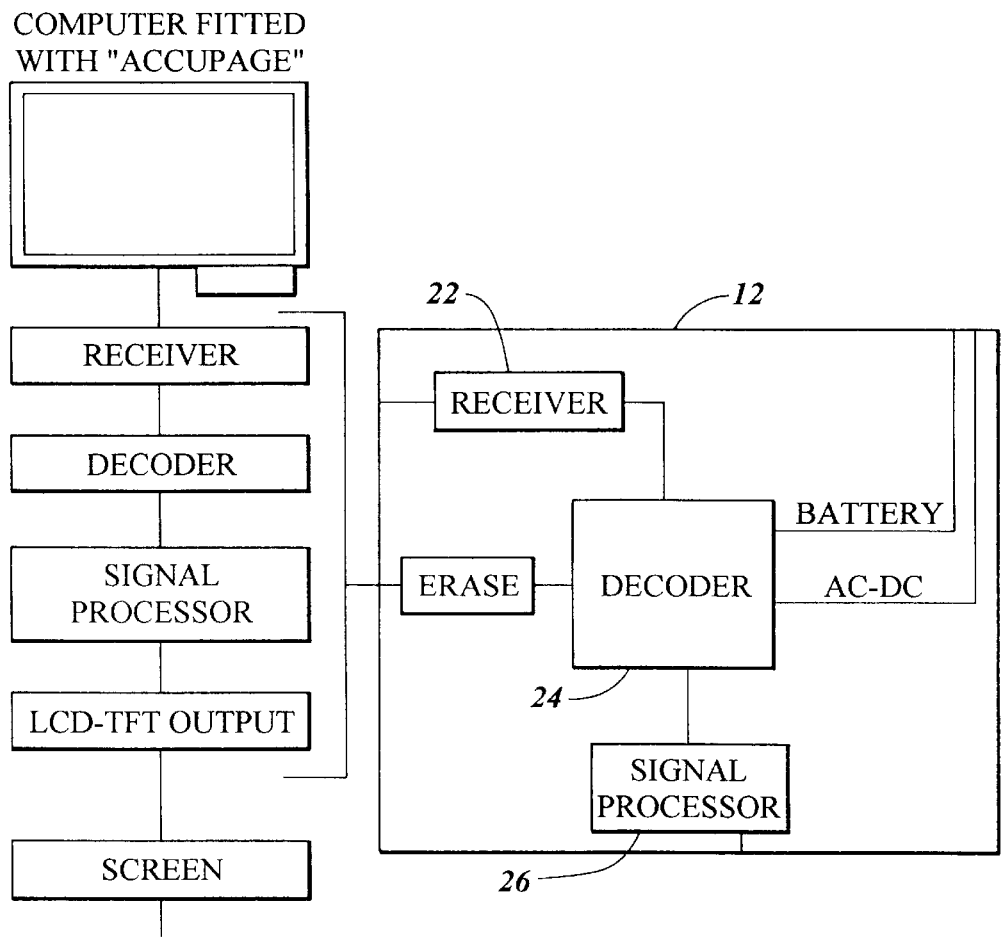
FIG. 5 shows the internal operation of the system in more detail.

FIG. 5 shows some of the internal construction of the card 12. It can be seen that a receiver unit 22 provides a received signal to a decoder 24 which considers the signal and if appropriate to that computer 10 triggers the superimposition of a message by the signal processor 26.

It will be appreciated that the above described example is by way of illustration only and many variations are possible whilst remaining within the scope of the present invention.

What is claimed is:

1. An anti-theft apparatus for disabling, in response to an externally specified status encoded on a broadcast status signal, a system having
   a first input,
   a processor unit in communication with said first input, said processor unit generating a first output on the basis of said first input, and
   a display unit in communication with said processor unit for display of said first output,
said anti-theft apparatus comprising:
   a second input operating independently of said first input, said second input receiving said broadcast status signal;
   a decoder in communication with said second input, said decoder configured to identify said externally specified status encoded on said broadcast status signal; and
   a signal processor in communication with said decoder and with said display unit, said signal processor obscuring said first output with a second output in response to said externally specified status identified by said decoder, thereby disabling said system.

2. The apparatus of claim 1 wherein said signal processor overprints said first output with said second output in response to said externally specified status identified by said decoder.

3. The apparatus of claim 1 further comprising, in communication with said signal processor, means for storing an identification code to be included in said second output.

4. The apparatus of claim 3 wherein said identification code is selected to uniquely identify said apparatus.

5. The apparatus of claim 1 further comprising a second power source for powering said apparatus, said second power source being separate from a first power source for powering said system.

6. The apparatus of claim 1 further comprising a visible indicator of the presence of said anti-theft device in said system.

7. A method for disabling, in response to an externally specified status encoded on a broadcast status signal, a system having
   a first input,
   a processor unit in communication with said first input and generating a first output on the basis of said first input, and
   a display unit in communication with said processor unit for display of said first output,
said method comprising the steps of:
   receiving said broadcast status signal on a second input operating independently of said first input;
   identifying said externally specified status encoded on said broadcast status signal; and
   on the basis of said externally specified status, obscuring said first output on said display unit, thereby disabling said system.

8. The method of claim 7 wherein said step of obscuring said first output comprises the steps of
   generating a second output in response to said broadcast status signal, and obscuring said first output with said second output.

9. The method of claim 8 wherein said step of generating said second output comprises the step of providing an identification code to be included in said second output.

10. The method of claim 9 wherein said step of providing an identification code comprises the step of selecting said identification code to uniquely identify said system.

11. The method of claim 7 further comprising the step of providing a second power source operating independently of a first power source for powering said system.

12. The method of claim 7 further comprising the step of providing a visible indicator of the association of an anti-theft apparatus with said system.

* * * * *